United States Patent
Satake et al.

(10) Patent No.: US 11,938,946 B2
(45) Date of Patent: Mar. 26, 2024

(54) LANE SHAPE RECOGNITION SYSTEM AND LANE SHAPE RECOGNITION METHOD

(71) Applicant: Mitsubishi Electric Corporation, Tokyo (JP)

(72) Inventors: Toshihide Satake, Tokyo (JP); Fumiaki Takagi, Tokyo (JP); Yuji Shimizu, Tokyo (JP); Kazuhiro Nishiwaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 132 days.

(21) Appl. No.: 17/607,532

(22) PCT Filed: Jul. 18, 2019

(86) PCT No.: PCT/JP2019/028216
§ 371 (c)(1),
(2) Date: Oct. 29, 2021

(87) PCT Pub. No.: WO2021/009894
PCT Pub. Date: Jan. 21, 2021

(65) Prior Publication Data
US 2022/0212673 A1    Jul. 7, 2022

(51) Int. Cl.
*B60W 40/072*    (2012.01)
*G06V 20/56*    (2022.01)

(52) U.S. Cl.
CPC ......... *B60W 40/072* (2013.01); *G06V 20/588* (2022.01); *B60W 2420/42* (2013.01); *B60W 2420/52* (2013.01)

(58) Field of Classification Search
None
See application file for complete search history.

(56) References Cited

U.S. PATENT DOCUMENTS

| | | | |
|---|---|---|---|
| 9,283,967 B2 * | 3/2016 | Lee | B60W 30/10 |
| 9,592,834 B2 * | 3/2017 | Takeda | G06T 7/73 |

(Continued)

FOREIGN PATENT DOCUMENTS

| | | |
|---|---|---|
| CN | 102201056 A | 9/2011 |
| CN | 105000016 A | 10/2015 |

(Continued)

OTHER PUBLICATIONS

International Search Report for PCT/JP2019/028216 dated, Sep. 10, 2019 (PCT/ISA/210).

(Continued)

*Primary Examiner* — Todd Melton
(74) *Attorney, Agent, or Firm* — Sughrue Mion, PLLC; Richard C. Turner

(57) ABSTRACT

To provide a lane shape recognition system and a lane shape recognition method which can determine an effective range of the approximated curve corresponding to the lane shape. A lane shape recognition system and a lane shape recognition method detects relative positions of a series of marks or objects which are continuously arranged in front of an own vehicle, with respect to the own vehicle; calculates a curve which approximates the relative positions of the series of marks or objects with respect to the own vehicle; and when a plurality of curves are calculated, mutually compare shapes of plurality of curves and determines the curves corresponding to the lane shape and the effective range of the curves.

13 Claims, 10 Drawing Sheets

(56) References Cited

U.S. PATENT DOCUMENTS

| | | | |
|---|---|---|---|
| 10,176,387 B2* | 1/2019 | Kawasaki | G06V 20/588 |
| 10,538,251 B2* | 1/2020 | Sakima | G08G 1/16 |
| 10,635,911 B2* | 4/2020 | Kumano | B60W 40/072 |
| 11,164,011 B2* | 11/2021 | Min | G08G 1/167 |
| 2011/0238252 A1 | 9/2011 | Takeda et al. | |
| 2015/0248763 A1* | 9/2015 | Kumano | G06T 7/73 |
| | | | 382/203 |
| 2015/0274164 A1 | 10/2015 | Terazawa et al. | |
| 2018/0001894 A1 | 1/2018 | Masui et al. | |

FOREIGN PATENT DOCUMENTS

| | | |
|---|---|---|
| JP | 2003-157499 A | 5/2003 |
| JP | 2012-022574 A | 2/2012 |
| JP | 2015-189411 A | 11/2015 |
| JP | 2016-134093 A | 7/2016 |

OTHER PUBLICATIONS

Notification of Reasons for Refusal dated Apr. 26, 2023 from the Chinese Patent Office in Application No. 201980098440.6.

* cited by examiner

LANE SHAPE RECOGNITION SYSTEM AND LANE SHAPE RECOGNITION METHOD

CROSS REFERENCE TO RELATED APPLICATIONS

This application is a National Stage of International Application No. PCT/JP2019/028216 filed Jul. 18, 2019.

TECHNICAL FIELD

The present disclosure is related with a lane shape recognition system and a lane shape recognition method.

BACKGROUND ART

Recently, the apparatus which recognizes the lane shape where the own vehicle travels and utilizes the recognized shape is becoming popular.

The recognized lane shape is used for detecting a preceding vehicle or an object which exists in front of the driving lane of the own vehicle. For example, in the following distance controller which keeps following distance with the preceding vehicle appropriately, the recognized lane shape is used for selecting the preceding vehicle appropriately. In the collision damage reduction system which performs a warning or an automatic braking when an object which may cause collision exists in front of the own vehicle, the recognized lane shape is used for choosing an object which may cause collision (for example, PLT 1).

In the lane departure preventing system which prevents the own vehicle from deviating from the driving lane, the recognized lane shape is used for anticipation of lane deviation (for example, PLT 2), or is used for the determination of the automatic steering amount.

As the means to recognize the lane shape, the method to approximate the right and left white lines by a straight line or a polynomial using the image processing result of the lane image imaged by the camera is known (for example, PLT 3 and PLT 4).

CITATION LIST

Patent Literature

PLT 1: JP 2016-134093 A
PLT 2: JP 2015-189411 A
PLT 3: JP 2003-157499 A
PLT 4: JP 2012-22574 A

SUMMARY OF INVENTION

Technical Problem

In the conventional lane shape recognition device, it is not clear how far the lane shape approximated by the curve coincides with the actual lane shape with good accuracy (that is, the effective range of the approximated curve).

On the other hand, it is desired to use the curve which approximates the lane shape up to a distant place as much as possible. However, when the accuracy of the approximated curve with respect to the actual lane shape is low, if the approximated curve is used up to the distant place too much compared with the accuracy, the preceding vehicle or the object may be selected erroneously.

Thus, it is desired to provide a lane shape recognition system and a lane shape recognition method which can determine an effective range of the approximated curve corresponding to the lane shape.

Solution to Problem

A lane shape recognition system according to the present disclosure, including:
a mark object detection unit that detects relative positions of a series of marks or objects which are continuously arranged in front of an own vehicle, with respect to the own vehicle;
an approximated curve calculation unit that calculates a curve which approximates the relative positions of the series of marks or objects; and
a curve effective range determination unit that, when a plurality of the curves are calculated, mutually compares shapes of the plurality of curves, and determines the curves corresponding to lane shape and an effective range of the curves.

A lane shape recognition method according to the present disclosure, including:
a mark object detection step that detects relative positions of a series of marks or objects which are continuously arranged in front of an own vehicle, with respect to the own vehicle;
an approximated curve calculation step that calculates a curve which approximates the relative positions of the series of marks or objects; and
a curve effective range determination step that, when a plurality of the curves are calculated, mutually compares shapes of the plurality of curves, and determines the curves corresponding to lane shape and an effective range of the curves.

Advantage of Invention

According to the lane shape recognition system and the lane shape recognition method of the present disclosure, by mutually comparing the shapes of plurality of curves, it can be determined whether each curve corresponds to the lane shape. Even if two curves correspond to the lane shape in the range where the information on the relative positions used for approximation exists, if the curves deviates from the lane shape in the range where the information on the relative positions used for approximation does not exist, the shapes of two curves does not correspond mutually. According to the above configuration, by mutually comparing the shapes of plurality of curves, the effective range of each curve corresponding to the lane shape can be determined.

DETAILED DESCRIPTION OF THE EMBODIMENTS

1. Embodiment 1

Figure 1:
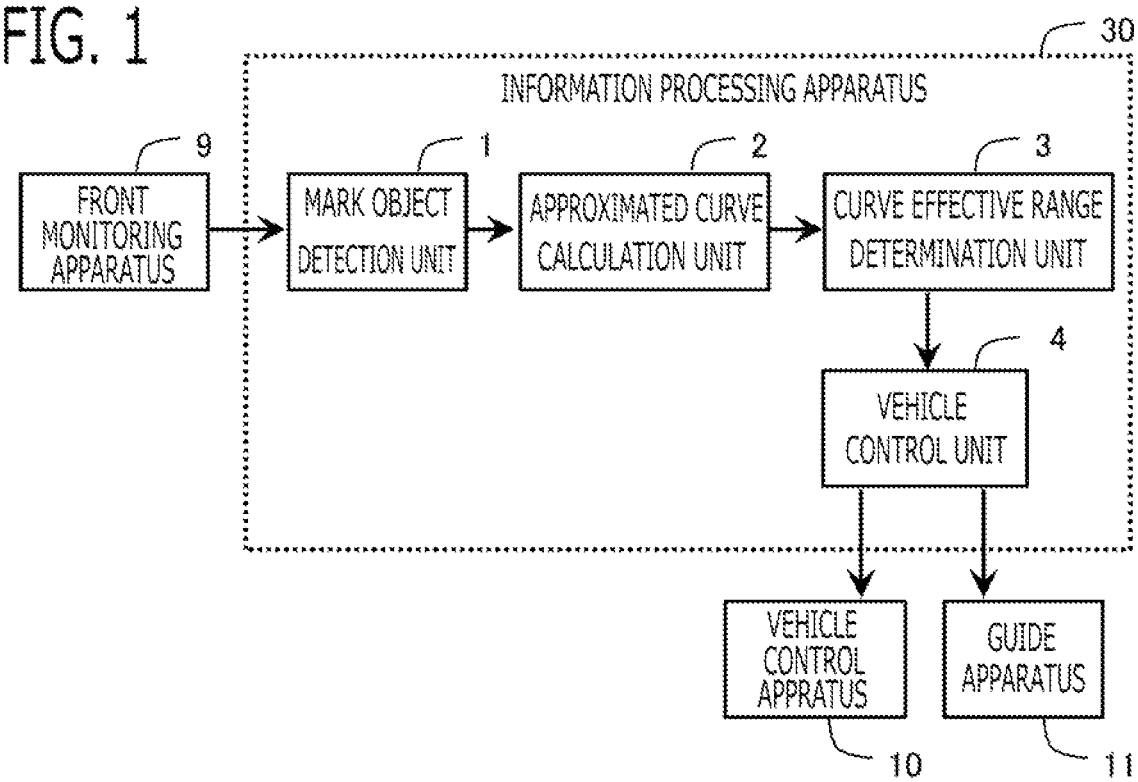
FIG. 1 is a schematic configuration diagram of the lane shape recognition system according to Embodiment 1.

A lane shape recognition system and a lane shape recognition method according to Embodiment 1 will be explained with reference to drawings. FIG. 1 is a schematic configuration diagram of the lane shape recognition system. The lane shape recognition system is provided with processing units such as a mark object detection unit 1, an approximated curve calculation unit 2, a curve effective range determination unit 3, and a vehicle control unit 4.

1-1. Information Processing Apparatus

Figure 2:
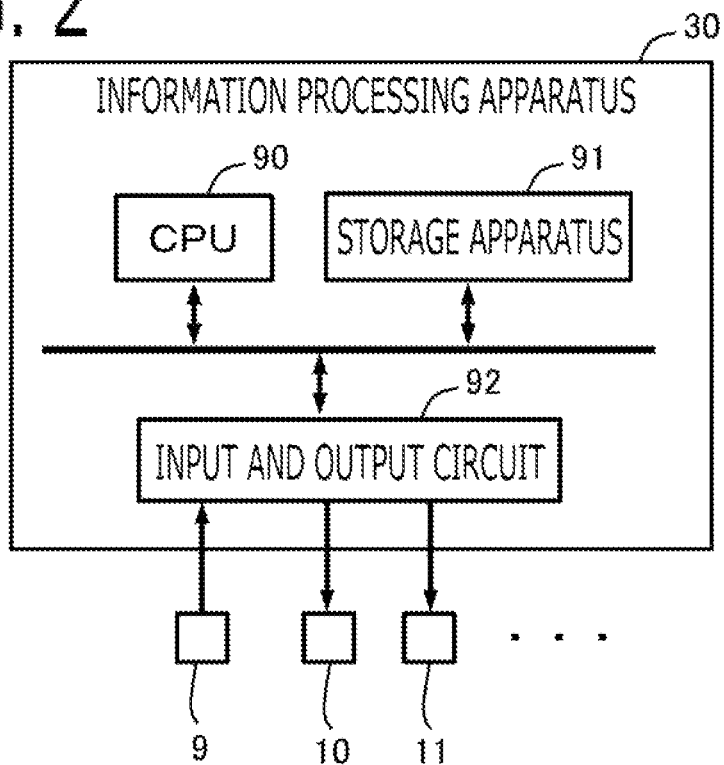
FIG. 2 is a hardware configuration diagram of the information processing apparatus according to Embodiment 1.

In the present embodiment, each processing unit 1 to 4 of the lane shape recognition system is provided in the information processing apparatus 30, and is realized by processing circuits provided in the information processing apparatus 30. Specifically, as shown in FIG. 2, the lane shape recognition system is provided, as processing circuits, with an arithmetic processor (computer) 90 such as a CPU (Central Processing Unit), storage apparatuses 91 which exchange data with the arithmetic processor 90, an input and output circuit 92 which inputs and outputs signals between the arithmetic processor 90 and the external apparatus, and the like.

As the arithmetic processor 90, DSP (Digital Signal Processor), ASIC (Application Specific Integrated Circuit), IC (Integrated Circuit), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatus 91, RAM (Random Access Memory), ROM (Read Only Memory), flash memory, and the like are provided. The input and output circuit 92 is provided with a communication circuit, an A/D converter, a driving circuit, and the like. As the external apparatus, a front monitoring apparatus 9, a vehicle control apparatus 10, a guide apparatus 11, and the like are provided.

Then, the arithmetic processor 90 runs software items (programs) stored in the storage apparatus 91 such as a ROM and collaborates with other hardware devices, such as the storage apparatuses 91, the input and output circuit 92, and the external apparatus, so that the respective functions of the processing units 1 to 4 provided in the information processing apparatus 30 are realized. Setting data items such as each threshold value and an allowable width range to be utilized in the processing units 1 to 4 are stored, as part of software items (programs), in the storage apparatus 91 such as a ROM.

1-2. Front Monitoring Apparatus 9

The front monitoring apparatus 9 is an apparatus which detects information on marks or objects which exist in front of the own vehicle. In the present embodiment, as the front monitoring apparatus 9, one or more of a camera, a radar, and the like are used. As the camera, an optical camera, such as a monocular camera or a stereo camera, are used. As the radar, a millimeter wave radar, a laser radar (LiDAR (Light Detection and Ranging)), an ultrasonic radar, or the like are used. In the present embodiment, especially, it is configured to monitor the front of the own vehicle, a front camera which images the front of the own vehicle, and a front radar which irradiates radio wave to the front of the own vehicle are provided. The kind, the number, and the arrangement of camera and radar may be set arbitrarily.

1-3. Mark Object Detection Unit 1

The mark object detection unit 1 detects relative positions of a series of marks or objects which are continuously arranged in front of the own vehicle, with respect to the own vehicle. The mark object detection unit 1 detects the marks or the objects which exist in front of the own vehicle, and detects the relative positions of the marks or the objects with respect to the own vehicle, based on the signal transmitted from the front monitoring apparatus 9.

For example, if the camera is provided as the front monitoring apparatus 9, the mark object detection unit 1 performs an image recognition processing to the image data imaged by the camera, detects the marks or the objects which exist in front of the own vehicle, and detects the relative positions of the marks or the objects with respect to the own vehicle. Various kinds of well-known methods are used for the image recognition processing.

If the millimeter wave radar is provided as the front monitoring apparatus 9, the mark object detection unit 1 detects the objects which exist in front of the own vehicle, and detects the relative positions of the objects with respect to the own vehicle, based on the detection information of the millimeter wave radar.

If the laser radar is provided as the front monitoring apparatus 9, the mark object detection unit 1 detects the marks or the objects which exist in front of the own vehicle, and detects the relative positions of the marks or the objects with respect to the own vehicle, based on the detection information of the laser radar.

If a plurality of the front monitoring apparatuses 9 are provided, the mark object detection unit 1 may integrate the detection information on the marks or the objects by the plurality of front monitoring apparatuses 9 to detect the marks or the objects in front of the own vehicle, and detect the relative positions of the marks or the objects.

Then, the mark object detection unit 1 determines the marks or the objects which are continuously arranged in front of the own vehicle, as one group. For example, marks or objects continuously extended toward the front of the own vehicle, or a plurality of marks or objects arranged in a line with intervals toward the front of the own vehicle are determined as one group. Various kinds of well-known methods are used for this determination.

For example, if the optical camera is provided as the front monitoring apparatus 9, the mark object detection unit 1 detects a series of road surface lane markings continuously arranged in front of the own vehicle by the image recognition processing, and detects the relative positions of each part of the series of road surface lane markings. In the road surface lane markings, a white line of a solid line or a dashed line is included. In the white line, colors other than white, for example, a yellow line and the like, are included. The mark object detection unit 1 may detect a series of roadside objects continuously arranged in front of the own vehicle by the image recognition processing. In the roadside objects, a guardrail, a center pole, a guide post, a curbstone, a wall, a roadside tree, and the like are included.

For example, if the millimeter wave radar is provided as the front monitoring apparatus 9, the mark object detection unit 1 detects a series of roadside objects continuously arranged in front of the own vehicle, and detects the relative position of each part of the series of roadside objects, based on the detection result of the objects by the millimeter wave radar.

For example, if the laser radar is provided as the front monitoring apparatus 9, the mark object detection unit 1 detects a series of roadside objects or road surface lane markings continuously arranged in front of the own vehicle, and detects the relative position of each part of the series of roadside objects or road surface lane markings, based on the detection result of the objects by the laser radar. In the detection information of the laser radar, the information on brightness of reflected light reflected from the object is also included, and the road surface lane markings are detected from the difference of brightness.

Figure 3:
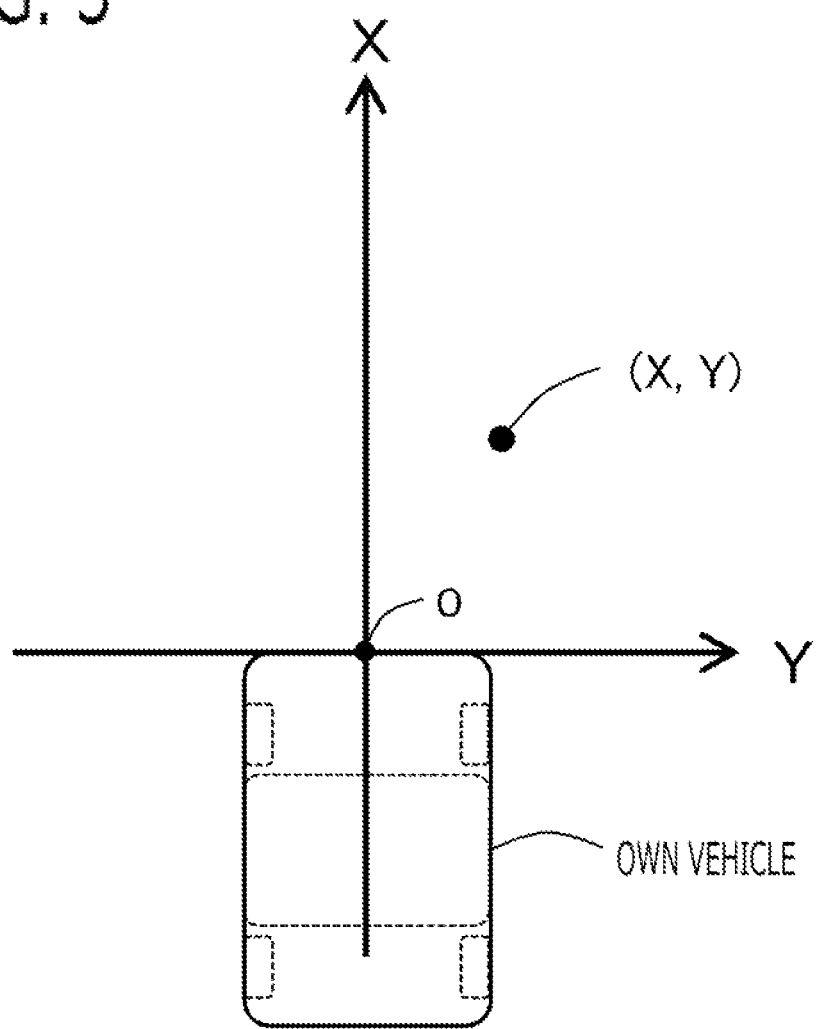
FIG. 3 is a figure for explaining the own vehicle coordinate system according to Embodiment 1.

For example, as shown in FIG. 3, the relative position of the mark or the object with respect to the own vehicle is a position information in a coordinate system (hereinafter, referred to as an own vehicle coordinate system) in which the front and back direction of the own vehicle is set as the first axis X, and the right and left direction of the own vehicle is set as the second axis Y. The front side in the front and back direction X is positive, and the backside is negative. The right side in the right and left direction Y is positive, and the left side is negative. The origin of the own vehicle coordinate system is set to the right and left center point in the front end of the own vehicle. As shown in FIG. 3, the relative position (X, Y) of the mark or the object in the own vehicle coordinate system is detected. The mark object detection unit 1 detects the relative position of each part of the series of marks or objects.

The mark object detection unit 1 detects the relative position of the object in front of the own vehicle which is not determined as the series of marks or objects. In the front object, a preceding vehicle, an obstacle, and the like are included.

1-4. Approximated Curve Calculation Unit 2

The approximated curve calculation unit 2 calculates a curve which approximates the relative positions of the series of marks or objects. In the present embodiment, the approximated curve calculation unit 2 calculates, as the curve, a polynomial in which a position X in the front and back direction of the own vehicle is set as an independent variable, and a position Y in the right and left direction of the own vehicle is set as a dependent variable. In the present embodiment, the curve is a third-order polynomial as shown in the next equation.

$$Y = C0 + C1 \times X + C2 \times X^2 + C3 \times X^3 \tag{1}$$

Since the lane is configured by a straight line, a transition section, and a circular arc according to law and ordinance, such as Road Construction Ordinance, it can be approximated with good accuracy by the third-order polynomial.

The approximated curve calculation unit 2 calculates the curve for each the series of marks or objects. The approximated curve calculation unit 2 approximates the relative positions of respective parts of the one series of marks or objects, to the polynomial by the least square method and the like. Each order coefficients C0, C1, C2, C3 of the polynomial are calculated by the least square method and the like.

If the optical camera is used as the front monitoring apparatus 9, the approximated curve calculation unit 2 calculates the curve for each the series of road surface lane markings. If the millimeter wave radar is used as the front monitoring apparatus 9, the approximated curve calculation unit 2 calculates the curve for each the series of roadside objects. If the laser radar is used as the front monitoring apparatus 9, the approximated curve calculation unit 2 calculates the curve for each the series of roadside objects or the series of road surface lane markings.

Figure 4:
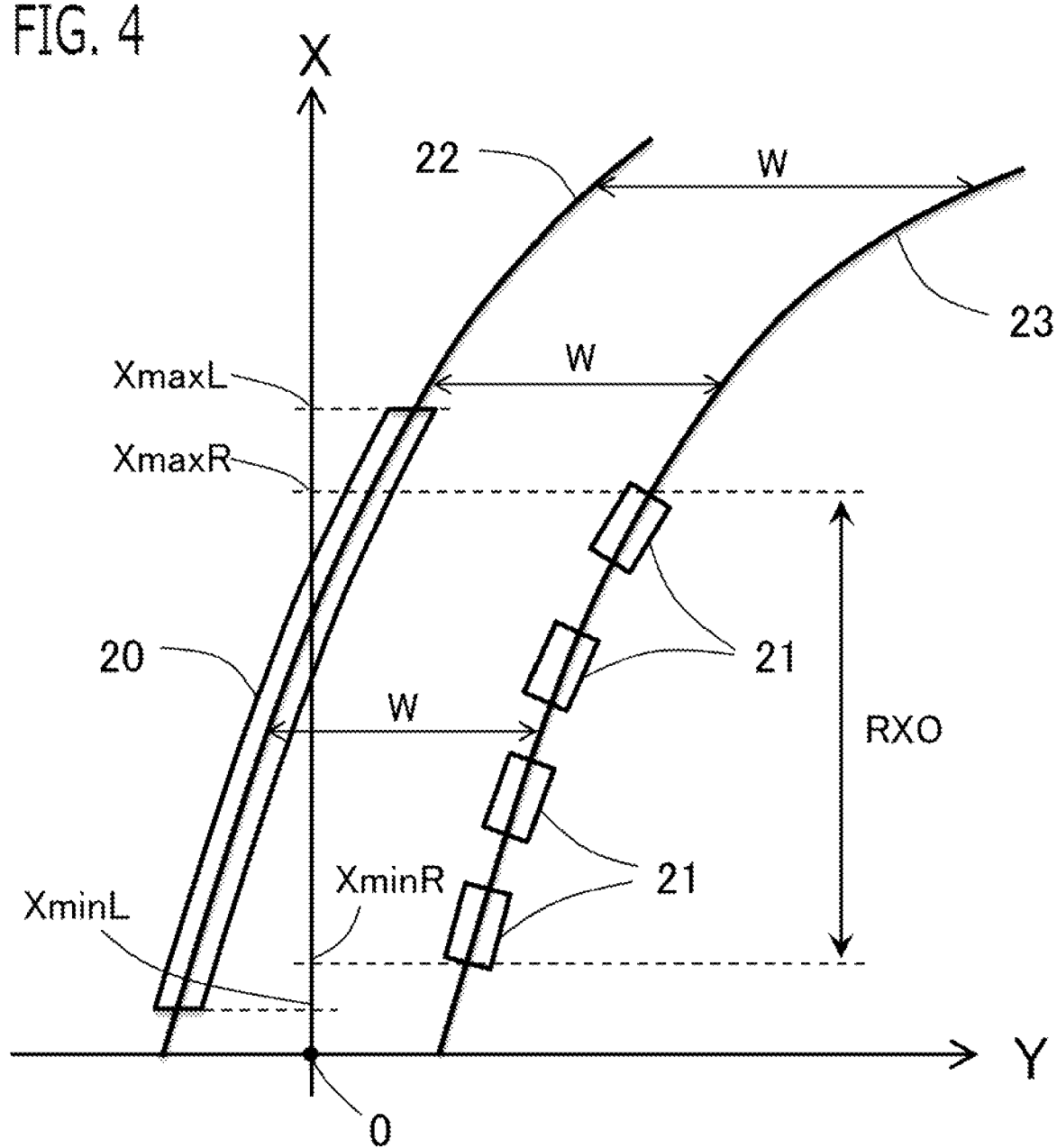
FIG. 4 is a figure for explaining the approximated curve calculation processing and the curve effective range determination processing according to Embodiment 1.

FIG. 4 shows an example if the optical camera is used as the front monitoring apparatus 9. As the series of marks, a white line 20 of solid line extending toward the front on the left side of the own vehicle is detected, and a white line 21 of dashed line extending toward the front on the right side of the own vehicle is detected. About each part of the white line of solid line on the left side, the relative positions with respect to the own vehicle are detected. About each part of the white line of broken line on the right side, the relative positions with respect to the own vehicle are detected.

The approximated curve calculation unit 2 calculates a third-order polynomial 22 (each order coefficient C0L, C1L, C2L, C3L) which approximates the white line 20 of solid line on the left side, as shown in the equation (2), and calculates a third-order polynomial 23 (each order coefficient C0R, C1R, C2R, C3R) which approximates the white line 21 of broken line on the right side, as shown in the equation (3).

$$Y = C0L + C1L \times X + C2L \times X^2 + C3L \times X^3 \tag{2}$$

$$Y = C0R + C1R \times X + C2R \times X^2 + C3R \times X^3 \tag{3}$$

1-5. Curve Effective Range Determination Unit 3

<Problem of Approximated Curve>

In the detected series of marks or objects, one which does not correspond to the lane shape in front of the own vehicle may be included. If the detected series of marks or objects corresponds to the lane shape in front of the own vehicle, in a range (hereinafter, also referred to as a range of interpolation) where the information on the relative positions used for approximation exists, there is a high possibility that the relative positions calculated using the approximated curve corresponds to the lane shape. However, in a range (hereinafter, also referred to as a range of extrapolation) where the information on the relative positions used for approximation does not exist, there is a high possibility that the relative positions calculated using the approximated curve deviates from the lane shape. Accordingly, it is desired to determine whether the approximated curve corresponds to the lane shape, and to determine a range where the approximated curve corresponds the lane shape.

<Mutual Comparison of Curves>

Then, when a plurality of series of marks or objects are detected and a plurality of curves are calculated, the curve effective range determination unit 3 mutually compares shapes of the plurality of curves, and determines the curves corresponding to lane shape and an effective range of the curves.

For example, when two curves correspond to the lane shape, the shapes of two curves corresponds mutually. According to the above configuration, by mutually comparing the shapes of plurality of curves, it can be determined whether each curve corresponds to the lane shape. Even if two curves correspond to the lane shape in the range of interpolation, if the curve deviates from the lane shape in the range of extrapolation, the shapes of two curves does not correspond mutually. According to the above configuration, by mutually comparing the shapes of plurality of curves, the effective range of each curve corresponding to the lane shape can be determined.

In the present embodiment, as explained in the following, the curve effective range determination unit 3 mutually compares the shapes of plurality of curves in the range of interpolation, and determines the curves corresponding to the lane shape; and also including the range of extrapolation, determines the effective range of the curves corresponding to the lane shape.

1-5-1. Determination of Two Curves corresponding to Lane Width

The curve effective range determination unit 3 sets a combination of the two curves from the plurality of curves. And, in an overlapping range RXO in the front and back direction of the own vehicle where a range in the front and back direction where the series of marks or object used for each approximation of the two curves are disposed overlaps between the two curves, the curve effective range determination unit 3 calculates a width W between the two curves in the right and left direction.

When the width W in the right and left direction deviates from a preliminarily set allowable width range RWP corresponding to the lane width, the curve effective range determination unit 3 determines that the two curves are not a combination corresponding to the lane shape. And, when the width W in the right and left direction falls within the allowable width range RWP, the curve effective range determination unit 3 determines that the two curves correspond to the lane shape.

When two curves correspond to the left edge and the right edge of the lane, at least in the range of interpolation, the width W in the right and left direction of two curves corresponds to the lane width. According to the above configuration, in the range (the range of interpolation) where the information on the relative positions used for approximation exists, when the width W in the right and left direction of two curves falls within the allowable width range RWP corresponding to the lane width, it can be determined that the two curves correspond to the lane shape; and when the width W in the right and left direction deviates from the allowable width range RWP, it can be determined that the two curves are not the combination corresponding to the lane shape.

For example, in the example shown in FIG. 4, since two curves of a left side curve 22 and a right side curve 23 are calculated, these two curves are set as the combination for determination. When three or more curves are calculated, a plurality of combinations of two curves are set (for example, settable number), and it is determined for each combination of two curves whether it corresponds to the lane shape. One curve is selected one by one from the left side curves of the own vehicle, and one curve is selected one by one from the right side curves; and the combinations of two curves may be set.

Then, in the example of FIG. 4, the range in the front and back direction X of the relative positions of the left side white line 20 of solid line used for approximation of the left side curve 22 becomes a range from the closest position XminL closest to the own vehicle to the farthest position XmaxL farthest from the own vehicle. The range in the front and back direction X of the relative positions of the right side white line 21 of broken line used for approximation of the right side curve 23 becomes a range from the closest position XminR closest to the own vehicle to the farthest position XmaxR farthest from the own vehicle. The overlapping range RXO overlapping between the left side range from the closest position XminL to the farthest position XmaxL and the right side range from the closest position XminR to the farthest position XmaxR becomes a range from the closest position XminR of right side to the farthest position XmaxR of right side.

Figure 5:
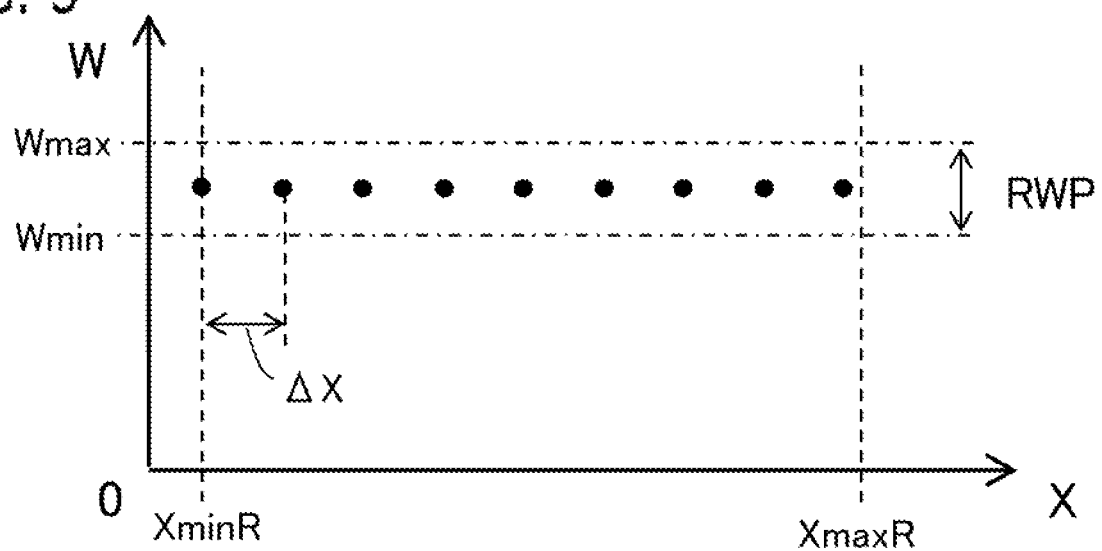
FIG. 5 is a figure for explaining the selection processing of two curves corresponding to the lane shape according to Embodiment 1.

Then, as shown in FIG. 5, the curve effective range determination unit 3 increases the position X in the front and back direction by a step interval $\Delta X$ from the closest position XminR of right side to the farthest position XmaxR of right side; and at each position X in the front and back direction, calculates the width W in the right and left direction between the left side curve 22 and the right side curve 23 using the next equation, and determines whether the width W in the right and left direction falls within the allowable width range RWP.

$$W=(C0R-C0L)+(C1R-C1L)\times X+(C2R-C2L)\times X^2+(C3R-C3L)\times X^3 \tag{4}$$

The allowable width range RWP is set to a range from the lower limit allowable width Wmin to the upper limit allowable width Wmax. The lower limit allowable width Wmin and the upper limit allowable width Wmax are set corresponding to the variation range of general lane width or the specification of lane width, for example.

In the example of FIG. 4 and FIG. 5, the width W in the right and left direction falls within the allowable width range RWP over the whole overlapping range RXO. Accordingly, the curve effective range determination unit 3 determines that the left side curve 22 and the right side curve 23 correspond to the lane shape. On the other hand, when the width W in the right and left direction does not fall within the allowable width range RWP even at a part of the overlapping range RXO, the curve effective range determination unit 3 determines that the two curves are not the combination corresponding to the lane shape. Alternatively, when the width W in the right and left direction does not falls within the allowable width range RWP in part more than the predetermined ratio (for example, 20%) of the overlapping range RXO, the curve effective range determination unit 3 may determine that the two curves are not the combination corresponding to the lane shape.

When determining that there is two or more of the combinations of two curves corresponding to the lane shape, the curve effective range determination unit 3 may determine the combination of two curves whose width W in the right and left direction is the closest to the center value of the allowable width range RWP in the overlapping range RXO, as the final two curves, and may exclude other combinations of two curves.

1-5-2. Determination of Effective Range of Curves

As determination of effective range of the curves, there are following "determination of effective range by curve width" and "determination of effective range by curvature difference."

1-5-2-1. Determination of Effective Range by Curve Width

In the range (the range of interpolation) where the information on the relative positions used for approximation exists, the correspondence degree of the curve to the lane shape is high. But, in the range (the range of extrapolation) where the information on the relative positions used for approximation does not exist, a possibility that the correspondence degree of the curve to the lane shape is deteriorated becomes high.

Accordingly, in the range of interpolation, it is highly possible that the width W in the right and left direction between two curves corresponds to the lane shape. But, as it is separated from the range of interpolation, there is a possibility that the width W in the right and left direction does not correspond to the lane shape. Then, in the determination of the effective range by curve width explained in the following, the effective range of two curves is determined by change of the width W in the right and left direction between two curves.

The curve effective range determination unit 3 sets a front and back reference position X0 within the overlapping range RXO in the front and back direction of the own vehicle where a range in the front and back direction where the series of marks or object used for each approximation of the two curves are disposed overlaps between the two curves. Then, the curve effective range determination unit 3 calculates a width in the right and left direction Y of the own vehicle between the two curves at the front and back reference position, as a reference width W0. In the present embodiment, as the two curves used for determination of the effective range, the two curves determined corresponding to the lane shape in the determination of two curves corresponding to the lane width are used.

The curve effective range determination unit 3 determines a range in the front and back direction X where an absolute value of deviation ΔW between a width W in the right and left direction Y between two curves at the position of the front and back direction X, and the reference width W0 becomes smaller than a width deviation threshold value JDW, as an effective range by width determination RXEW.

According to this configuration, on the basis of the reference width W0 within the overlapping range RXO in the front and back direction, the range in the front and back direction X where the accuracy of the width W in the right and left direction is maintained is determined as the effective range. Therefore, the effective range of the curves corresponding to the lane shape can be determined with good accuracy.

In the present embodiment, as explained in the following, the determination of the effective range by width determination RXEW is divided into a determination on the farther side than the front and back reference position X0, and a determination on the closer side than the front and back reference position X0.

<Determination on Farther Side>

In the position close to the own vehicle, the detection accuracy of the relative positions of marks or objects is high, and the correspondence degree of the curve to the lane shape is high. However, as it is separated from the own vehicle to the front, the detection accuracy of the relative positions of marks or objects is deteriorated, and when it enters within the range of extrapolation, there is a possibility that the correspondence degree of the curve to the lane shape is deteriorated. Accordingly, the width W in the right and left direction between two curves in the position close to the own vehicle corresponds to the lane shape. But, as it is separated from the own vehicle to the front, there is a possibility that the width W in the right and left direction does not correspond to the lane shape.

In the present embodiment, the curve effective range determination unit 3 sets a position in the front and back direction X closest to the own vehicle within the overlapping ranges RXO, as the front and back reference position X0; and calculates a width in the right and left direction of the own vehicle between two curves at the front and back reference position X0, as the reference width W0.

The curve effective range determination unit 3 determines, as a width determination upper limit position XWmax, a position in the front and back direction where the absolute value of width deviation ΔW between the width W in the right and left direction between two curves at the position X in the front and back direction, and the reference width W0 becomes larger than the width deviation threshold value JDW, when the position X in the front and back direction is gradually separated from the front and back reference position X0 (in this example, gradually increased). Then, the curve effective range determination unit 3 determines a range from the front and back reference position X0 to the width determination upper limit position XWmax, as the effective range by width determination RXEW.

According to this configuration, on the basis of the reference width W0 which is close to the own vehicle and has high accuracy, a farther side range where the accuracy of the width W in the right and left direction is maintained is determined. Accordingly, the effective range of the curves corresponding to the lane shape can be determined with good accuracy.

For example, in the example in FIG. 4, as mentioned above, the overlapping range RXO becomes the range from the closest position XminR of right side to the farthest position XmaxR of right side, and the front and back reference position X0 is set to the closest position XminR of right side. Then, using the equation (4), at the front and back reference position X0 (the closest position XminR of right side), the width W in the right and left direction is calculated, and it is set as the reference width W0.

Figure 6:
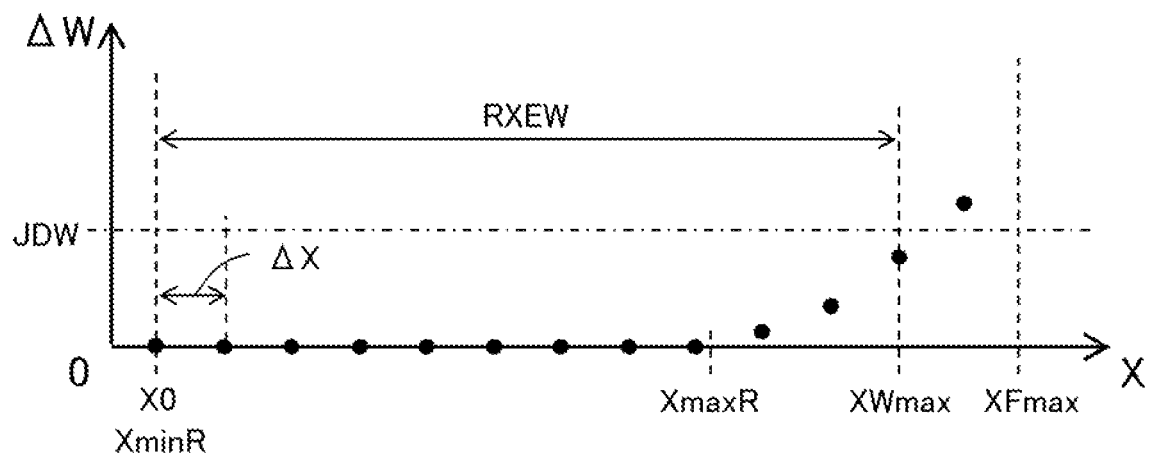
FIG. 6 is a figure for explaining the determination processing of the effective range by curve width on the farther side according to Embodiment 1.

Then, as shown in FIG. 6, the curve effective range determination unit 3 increases the position X in the front and back direction by the step interval ΔX from the front and back reference position X0 to the front upper limit position XFmax; and calculates the width W in the right and left direction between the left side curve 22 and the right side curve 23 at each position X in the front and back direction using the equation (4), and calculates the absolute value of width deviation ΔW between the calculated width W in the right and left direction and the reference width W0 using the next equation. The front upper limit position XFmax is an upper limitation value that prevents the effective range from becoming too long.

$$\Delta W = |W - W0| \qquad (5)$$

Then, the curve effective range determination unit 3 determines a position X in the front and back direction (in this example, just before position) where the absolute value of width deviation ΔW exceeded the width deviation threshold value JDW, as the width determination upper limit position XWmax; and determines a range from the front and back reference position X0 to the width determination upper limit position XWmax, as the effective range by width determination RXEW. Even when the position X in the front and back direction is increased to the front upper limit position XFmax, and when the absolute value of width deviation ΔW does not exceed the width deviation threshold value JDW, the curve effective range determination unit 3 sets the front upper limit position XFmax as the width determination upper limit position XWmax (XWmax=XFmax).

<Determination on Closer Side>

Figure 7:
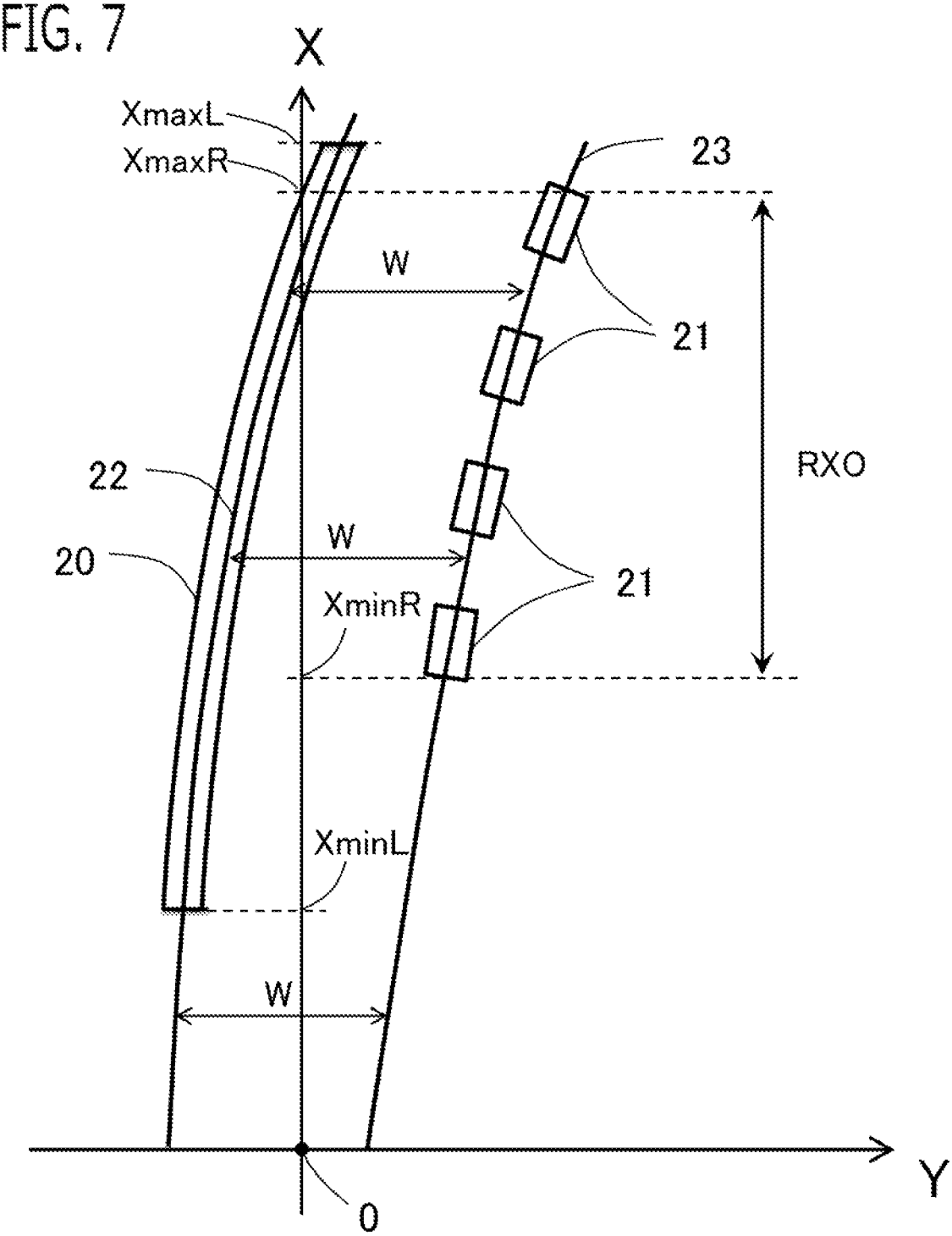
FIG. 7 is a figure for explaining the approximated curve calculation processing and the curve effective range determination processing according to Embodiment 1.

In the example shown in FIG. 4 and FIG. 6, the white line is detected close to the own vehicle, and the closest position (the front and back reference position X0) of the overlapping range RXO becomes close to the own vehicle. Accordingly, the range of extrapolation close to the own vehicle is short, and there is no problem even if this range of extrapolation is not used. However, as shown in the example of FIG. 7, when the closest position of the detected white line is far from the own vehicle, the closest position (the front and back reference position X0) of the overlapping range RXO becomes far from the own vehicle, and the range of extrapolation close to the own vehicle becomes long. In this case, it is conceivable to determine the curve effective range also on the closer side, and utilize the curve.

Then, the curve effective range determination unit 3 determines, as the width determination lower limit position XWmin, a position X in the front and back direction where the absolute value of width deviation $\Delta W$ between a width W in the right and left direction between two curves at the position X in the front and back direction, and the reference width W0 becomes larger than the width deviation threshold value JDW, when a position X in the front and back direction is gradually brought close from the front and back reference position X0; and adds a range from the width determination lower limit position XWmin to the front and back reference position X0, to the effective range by width determination RXEW.

Figure 8:
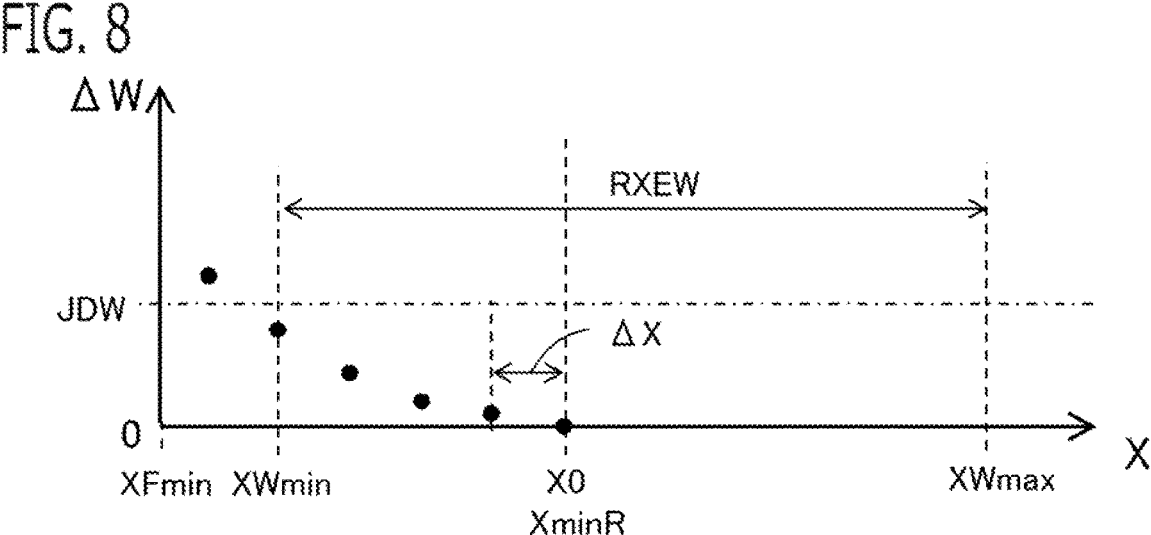
FIG. 8 is a figure for explaining the determination processing of the effective range by curve width on the closer side according to Embodiment 1.

For example, in the example of FIG. 7, as shown in FIG. 8, the curve effective range determination unit 3 decreases the position X in the front and back direction by the step interval $\Delta X$ from the front and back reference position X0 to the front lower limit position XFmin (for example, 0); calculates the width W in the right and left direction between the left side curve 22 and the right side curve 23 at each position X in the front and back direction using the equation (4); and calculates the absolute value of width deviation $\Delta W$ between the calculated width W in the right and left direction and the reference width W0 using the equation (5).

Then, the curve effective range determination unit 3 determines a position X in the front and back direction (in this example, just before position) where the absolute value of width deviation $\Delta W$ exceeded the width deviation threshold value JDW, as the width determination lower limit position XWmin; and adds a range from the width determination lower limit position XWmin to the front and back reference position X0, to the effective range by width determination RXEW. Accordingly, the final effective range by width determination RXEW becomes a range from the width determination lower limit position XWmin to the width determination upper limit position XWmax. Even when the position X in the front and back direction is decreased to the front lower limit position XFmin, and when the absolute value of width deviation $\Delta W$ does not exceed the width deviation threshold value JDW, the curve effective range determination unit 3 sets the front lower limit position XFmin as the width determination lower limit position XWmin (XWmin=XFmin).

1-5-2-2. Determination of Effective Range by Curvature Difference

In the range (the range of interpolation) where the information on the relative positions used for approximation exists, the correspondence degree of the curve to the lane shape is high. But, in the range (the range of extrapolation) where the information on the relative positions used for approximation does not exist, there is a possibility that the correspondence degree of the curve to the lane shape is deteriorated.

Accordingly, in the range of interpolation, it is highly possible that the curvatures of two curves correspond to the lane shape, and correspond mutually. But, as it is separated from the range of interpolation, it is highly possible that curvatures of two curves does not correspond mutually. Then, in the determination of the effective range by curvature difference explained in the following, the effective range of two curves is determined by a deviation between the curvatures of two curves.

The curve effective range determination unit 3 determines a range in the front and back direction X where an absolute value of deviation $\Delta \rho$ between the curvatures of two curves becomes smaller than a curvature deviation threshold value JDP, as an effective range by curvature determination RXEP.

According to this configuration, the range in the front and back direction X where the curvatures of two curves correspond mutually is determined. Accordingly, the effective range of the curves corresponding to the lane shape can be determined with good accuracy.

In the present embodiment, as explained in the following, the determination of the effective range by curvature determination RXEP is divided into a determination on the farther side than the front and back reference position X0, and a determination on the closer side than the front and back reference position X0.

<Determination on Farther Side>

In the position close to the own vehicle, the detection accuracy of the relative positions of marks or objects is high, and the correspondence degree of the curve to the lane shape is high. However, as it is separated from the own vehicle to the front, the detection accuracy of the relative positions of marks or objects is deteriorated, and when it enters within the range of extrapolation, there is a possibility that the correspondence degree of the curve to the lane shape is deteriorated. Accordingly, the curvatures of two curves in the position close to the own vehicle correspond to the lane shape and correspond mutually. But, as it is separated from the own vehicle to the front, there is a possibility that the curvatures of two curves do not correspond mutually.

Similar to the determination of the effective range by curve width, the curve effective range determination unit 3 sets a position in the front and back direction X closest to the own vehicle within the overlapping ranges RXO, as the front and back reference position X0. In the present embodiment, as the two curves used for determination of the effective range by curvature difference, the two curves determined corresponding to the lane shape in the determination of two curves corresponding to the lane width are used.

The curve effective range determination unit 3 determines, as a curvature determination upper limit position XPmax, a position in the front and back direction where the absolute value of curvature deviation $\Delta \rho$ between the curvatures of two curves at the position X in the front and back direction becomes larger than a curvature deviation threshold value JDP, when the position X in the front and back direction is gradually separated from the front and back reference position X0 (in this example, gradually increased). Then, the curve effective range determination unit 3 determines a range from the front and back reference position X0 to the curvature determination upper limit position XPmax, as the effective range by curvature determination RXEP.

According to this configuration, on the basis of the front and back reference position X0 close to the own vehicle, the range on the farther side where the curvatures of two curves correspond mutually is determined. Accordingly, the effective range of the curves corresponding to the lane shape can be determined with good accuracy.

Figure 9:
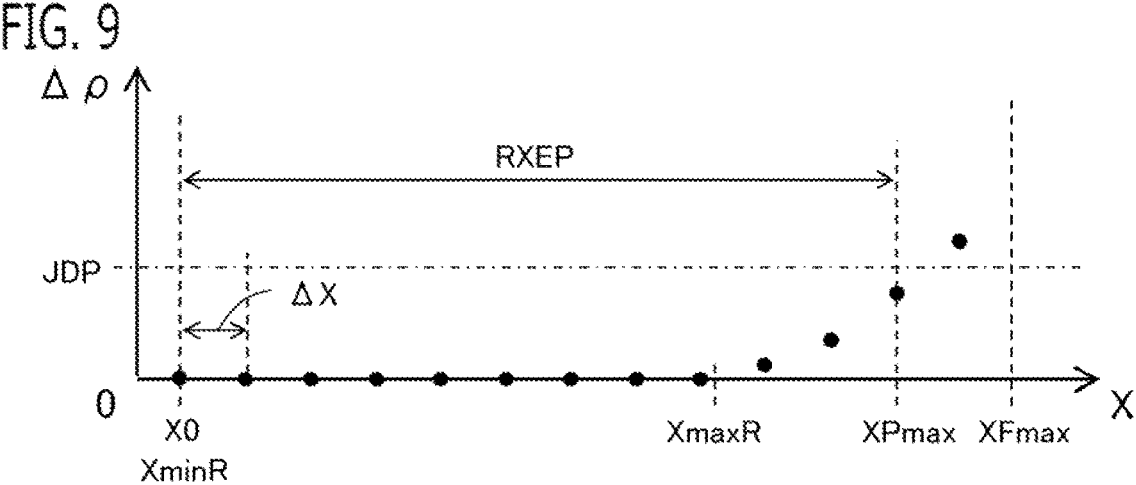
FIG. 9 is a figure for explaining the determination processing of the effective range by curvature difference on the farther side according to Embodiment 1.

For example, in the example in FIG. 4, as shown in FIG. 9, the curve effective range determination unit 3 increases the position X in the front and back direction by the step interval $\Delta X$ from the front and back reference position X0 to the front upper limit position XFmax; and at each position X in the front and back direction, calculates the curvature $\rho L$ of the left side curve 22 using the equation (6), calculates the curvature $\rho R$ of the right side curve 23 using the equation (7), and calculates the absolute value of curvature deviation $\Delta \rho$ between two curvatures $\rho L$, $\rho R$ using the equation (8).

$$\rho L = 2 \times C2L + 6 \times C3L \times X \quad (6)$$

$$\rho R = 2 \times C2R + 6 \times C3R \times X \quad (7)$$

$$\Delta \rho = |\rho L - \rho R| \quad (8)$$

Then, the curve effective range determination unit 3 determines a position X in the front and back direction (in this example, just before position) where the absolute value of curvature deviation $\Delta \rho$ exceeded the curvature deviation threshold value JDP, as the curvature determination upper limit position XPmax; and determines a range from the front and back reference position X0 to the curvature determination upper limit position XPmax, as the effective range by curvature determination RXEP. Even when the position X in the front and back direction is increased to the front upper limit position XFmax, and when the absolute value of curvature deviation $\Delta \rho$ does not exceed the curvature deviation threshold value JDP, the curve effective range determination unit 3 sets the front upper limit position XFmax as the curvature determination upper limit position XPmax (XPmax=XFmax).

<Determination on Closer Side>

Similar to the determination of the effective range by curve width mentioned above using the example of FIG. 7, a determination on the closer side in the determination of the effective range by curvature difference is explained.

The curve effective range determination unit 3 determines, as a curvature determination lower limit position XPmin, a position X in the front and back direction where the absolute value of the deviation $\Delta \rho$ between the curvatures of two curves at the position X in the front and back direction becomes larger than the curvature deviation threshold value JDP, when a position X in the front and back direction is gradually brought close from the front and back reference position X0; and adds a range from the curvature determination lower limit position XPmin to the front and back reference position X0, as the effective range by curvature determination RXEP.

Figure 10:
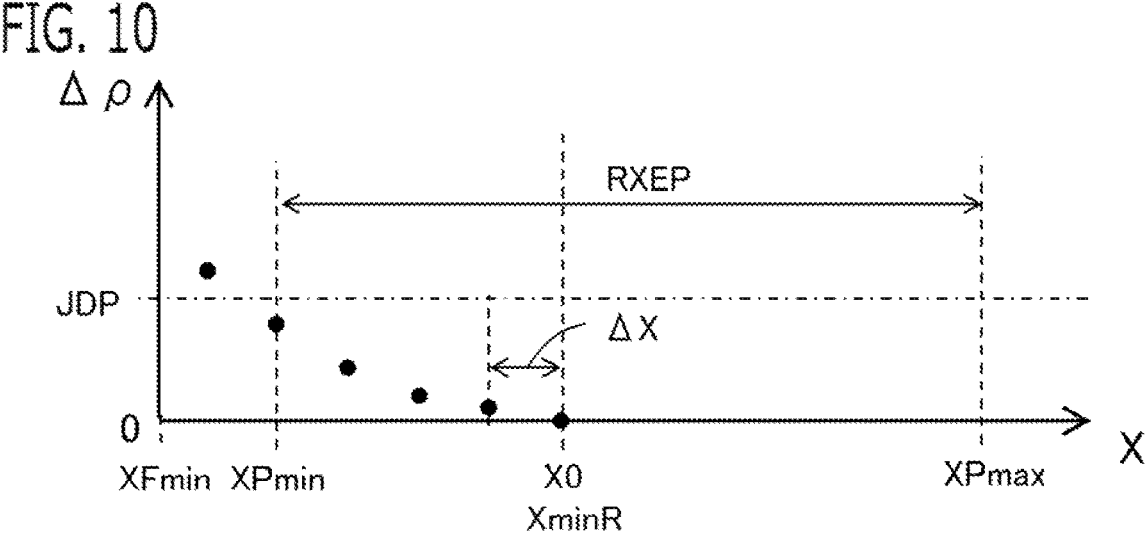
FIG. 10 is a figure for explaining the determination processing of the effective range by curvature difference on the closer side according to Embodiment 1.

For example, in the example of FIG. 7, as shown in FIG. 10, the curve effective range determination unit 3 decreases the position X in the front and back direction by the step interval $\Delta X$ from the front and back reference position X0 to the front lower limit position XFmin (for example, 0); and at each position X in the front and back direction, calculates the curvature $\rho L$ of the left side curve 22 using the equation (6), calculates the curvature $\rho R$ of the right side curve 23 using the equation (7), and calculates the absolute value of curvature deviation $\Delta \rho$ between two curvatures $\rho L$, $\rho R$ using the equation (8).

Then, the curve effective range determination unit 3 determines a position X in the front and back direction (in this example, just before position) where the absolute value of curvature deviation $\Delta \rho$ exceeded the curvature deviation threshold value JDP, as the curvature determination lower limit position XPmin; and adds a range from the curvature determination lower limit position XPmin to the front and back reference position X0, as the effective range by curvature determination RXEP. Accordingly, the final effective range by curvature determination RXEP becomes a range from the curvature determination lower limit position XPmin to the curvature determination upper limit position XPmax. Even when the position X in the front and back direction is decreased to the front lower limit position XFmin, and when the absolute value of curvature deviation $\Delta \rho$ does not exceed the curvature deviation threshold value JDP, the curve effective range determination unit 3 sets the front lower limit position XFmin as the curvature determination lower limit position XPmin (XPmin=XFmin).

1-5-2-3. Integration of Two Determination Results of Effective Ranges

The curve effective range determination unit 3 sets an overlapping range between the effective range by width determination RXEW and the effective range by curvature determination RXEP, as the final effective range. That is to say, the curve effective range determination unit 3 sets a range between any larger (farther) one of the width determination lower limit position XWmin and the curvature determination lower limit position XPmin, and any smaller (closer) one of the width determination upper limit position XWmax and the curvature determination upper limit position XPmax, as the final effective range. Accordingly, since the curve effective range is determined from two viewpoints of the width of two curves and the deviation between the curvatures of two curves, the determination accuracy can be improved.

1-6. Vehicle Control Unit 4

The vehicle control unit 4 performs one or both of a traveling control of vehicle and a guidance of traveling information of vehicle to the driver, based on information on the curve within the effective range. For example, as the traveling control of vehicle, the vehicle control unit 4 sets an area between two curves within the effective range as the driving lane of the own vehicle, and performs a collision prevention traveling control with a preceding vehicle or an obstacle which exists in the driving lane, a tracking travel control to a preceding vehicle, a lane keeping traveling control to the driving lane, or the like. The vehicle control unit 4 calculates commands related to the traveling control, such as an acceleration and deceleration command, a brake command, and a steering angle command, and transmits to the vehicle control apparatus 10. For example, the vehicle control apparatus 10 is a controller which integrates each controller, transmits a command for changing driving force to a controller of driving force source such as an engine and a motor, transmits an operating command of brake to a controller of brake, and transmits a command of steering angle to a controller of electric power steering.

For example, as the guidance of traveling information of vehicle, the vehicle control unit 4 sets an area between two curves within the effective range as the driving lane of the own vehicle, and performs a guidance of collision warning with a preceding vehicle or an obstacle which exists in the driving lane, a guidance of deviation warning from the driving lane, a guidance of the driving lane, or the like. The vehicle control unit 4 transmits information related to these guidance to the guide apparatus 11. The guide apparatus 11 controls a loudspeaker, a display, a lamp, a vibration device, or the like, and informs each guidance to the driver.

1-7. Flowchart

Figure 11:
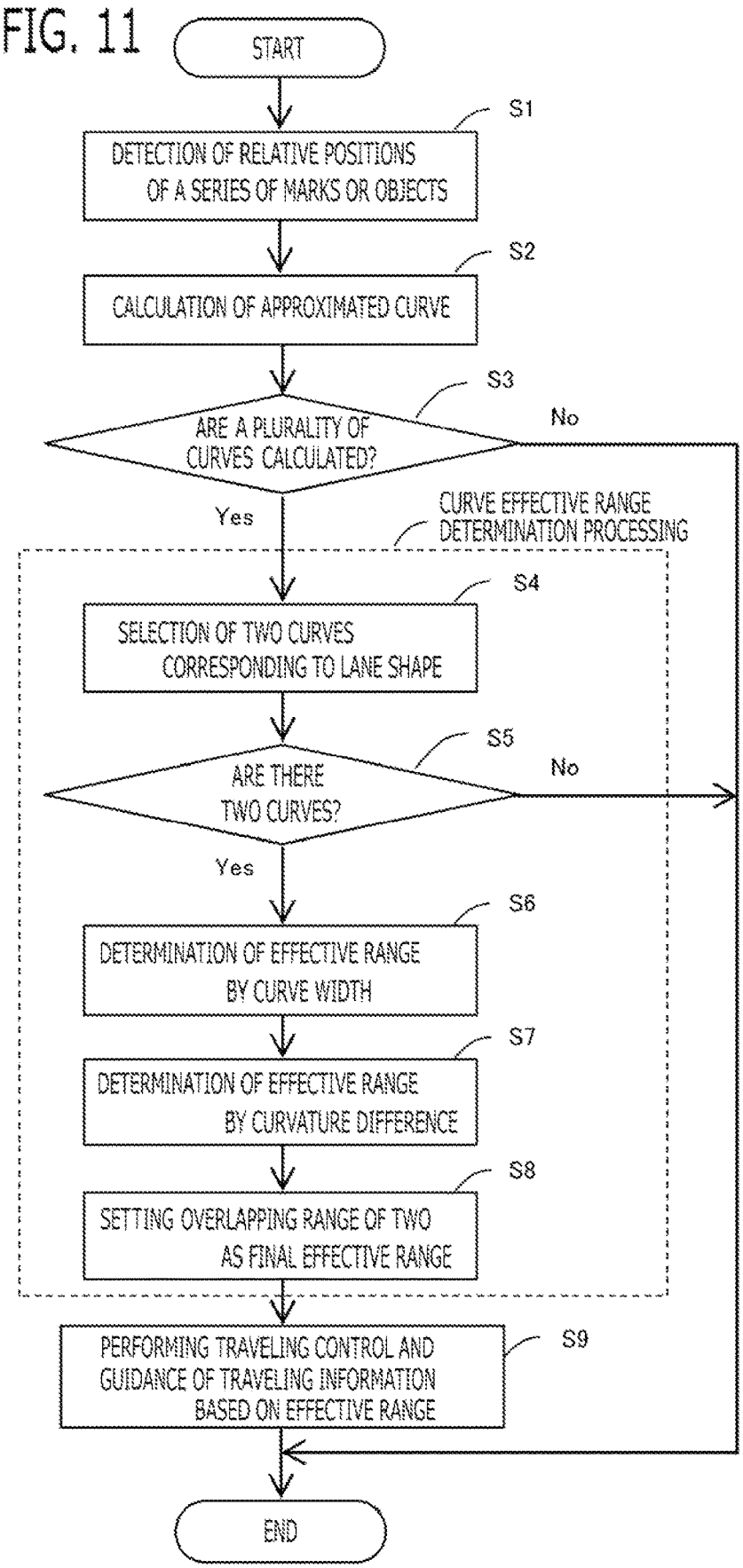
FIG. 11 is a flowchart for explaining processing according to Embodiment 1.

Next, processing of the lane shape recognition system and the lane shape recognition method according to the present embodiment is explained with reference to the flowchart of FIG. 11. The processing represented in the flowchart in FIG. 11 is recurrently implemented, for example, every predetermined operation cycle while the arithmetic processor 90 implements software (a program) stored in the storage apparatus 91.

In the step S1, as mentioned above, the mark object detection unit 1 detects relative positions of a series of marks or objects which are continuously arranged in front of the own vehicle, with respect to the own vehicle. In the present embodiment, the mark object detection unit 1 detects the marks or the objects which exist in front of the own vehicle, and detects the relative positions of the marks or the objects with respect to the own vehicle, based on the signal transmitted from the front monitoring apparatus 9. Then, the mark object detection unit 1 determines the marks or the objects continuously arranged in front of the own vehicle, as one group.

Next, in the step S2, as mentioned above, the approximated curve calculation unit 2 calculates a curve which approximates the relative positions of the series of marks or objects. In the present embodiment, the approximated curve calculation unit 2 calculates, as the curve, a polynomial in which a position X in the front and back direction of the own vehicle is set as an independent variable, and a position Y in the right and left direction of the own vehicle is set as a dependent variable. In the present embodiment, the curve is a third-order polynomial.

Next, in the step S3, the curve effective range determination unit 3 determines whether a plurality of curves are calculated, advances to the step S4 when the plurality of curves are calculated, and ends a series of processing when a plurality of curves are not calculated. In the step S4 to the step S8, as mentioned above, the curve effective range determination unit 3 mutually compares shapes of the plurality of curves, and determines the curves corresponding to the lane shape and the effective range of the curves.

In the present embodiment, in the step S4, as mentioned above, as the determination of two curves corresponding to the lane width, the curve effective range determination unit 3 sets a combination of the two curves from the plurality of curves; and, in an overlapping range RXO in the front and back direction of the own vehicle where a range in the front and back direction where the series of marks or object used for each approximation of the two curves are disposed overlaps between the two curves, calculates a width W between the two curves in the right and left direction. When the width W in the right and left direction deviates from a preliminarily set allowable width range RWP corresponding to the lane width, the curve effective range determination unit 3 determines that the two curves are not a combination corresponding to the lane shape. And, when the width W in the right and left direction falls within the allowable width range RWP, the curve effective range determination unit 3 determines that the two curves correspond to the lane shape. When three or more curves are calculated, a plurality of combinations of two curves are set, and it is determined for each combination of two curves whether it corresponds to the lane shape.

Next, in the step S5, the curve effective range determination unit 3 advances to the step S6 when determining that there is a combination of two curves corresponding to the lane shape, and ends a series of processing when determining that there is no combination.

In the step S6, as mentioned above, as the determination of the effective range by curve width, the curve effective range determination unit 3 sets a front and back reference position X0 within the overlapping range RXO in the front and back direction of the own vehicle where a range in the front and back direction where the series of marks or object used for each approximation of the two curves are disposed overlaps between the two curves. Then, the curve effective range determination unit 3 calculates a width in the right and left direction Y of the own vehicle between the two curves at the front and back reference position, as a reference width W0. The curve effective range determination unit 3 determines a range in the front and back direction X where an absolute value of deviation ΔW between a width W in the right and left direction Y between two curves at the position of the front and back direction X, and the reference width W0 becomes smaller than a width deviation threshold value JDW, as an effective range by width determination RXEW. In the present embodiment, as mentioned above, the determination on farther side and the determination on closer side are performed.

In the step S7, as mentioned above, as the determination of the effective range by curvature difference, the curve effective range determination unit 3 determines a range in the front and back direction X where an absolute value of deviation Δρ between the curvatures of two curves becomes smaller than a curvature deviation threshold value JDP, as an effective range by curvature determination RXEP. In the present embodiment, as mentioned above, the determination on farther side and the determination on closer side are performed.

In the step S8, as mentioned above, the curve effective range determination unit 3 sets an overlapping range between the effective range by width determination RXEW and the effective range by curvature determination RXEP, as the final effective range.

Then, in the step S09, as mentioned above, the vehicle control unit 4 performs one or both of a traveling control of vehicle and a guidance of traveling information of vehicle to the driver, based on information on the curve within the effective range.

2. Embodiment 2

Next, the lane shape recognition system and the lane shape recognition method according to Embodiment 2 will be explained. The explanation for constituent parts the same as those in Embodiment 1 will be omitted. The basic configuration and processing of the lane shape recognition system according to the present embodiment are the same as those of Embodiment 1. Embodiment 2 is different from Embodiment 1 in processing which determines two curves corresponding to the lane shape from a plurality of curves in the curve effective range determination unit 3.

In the curves corresponding to the lane shape, change tendencies of the position Y in the right and left direction with respect to the change of the position X in the front and back direction correspond with each other. Accordingly, when a plurality of the series of marks or objects are detected and a plurality of curves are calculated, by excluding a curve whose change tendency of the right and left direction with respect to the change of the front and back direction is different from others, two curves corresponding to the lane shape can be selected from the plurality of curves.

Then, in the present embodiment, the curve effective range determination unit 3 sets a front and back reference position for right and left deviation X0RL in the front and back direction of the own vehicle. About each of the plurality of curves, the curve effective range determination unit 3 calculates a position Y in the right and left direction of the own vehicle at the front and back reference position for right and left deviation X0RL, as a right and left reference position Y0RL. About each of the plurality of curves, the curve effective range determination unit 3 calculates a right and left deviation ΔY0RL which is a deviation between a position Y of the curve in the right and left direction, and the right and left reference position Y0RL, at each position X in the front and back direction. Then, when changing a position X in the front and back direction from the front and back reference position for right and left deviation X0RL, the curve effective range determination unit 3 excludes the curve whose the right and left deviation ΔY0RL deviates from a median ΔY0RL_M of the right and left deviations ΔY0RL of the plurality of curves by a right and left deviation threshold value JDRL or more, from the plurality of curves, until becoming two curves; and determines that the remaining two curves correspond to the lane shape.

According to this configuration, by calculating the right and left deviation ΔY0RL between the right and left reference position Y0RL and the position Y of the curve in the right and left direction at each position X in the front and back direction. The change tendency of the right and left direction with respect to the change of the front and back direction can be calculated. Then, by excluding the curve whose right and left deviation ΔY0RL deviates from the median ΔY0RL_M of the right and left deviations ΔY0RL of the plurality of curves by the right and left deviation threshold value JDRL or more, from the plurality of curves, the curve whose change tendency of the right and left direction with respect to the change of the front and back direction is different from others can be excluded. Then, the two curves corresponding to the lane shape can be selected.

Figure 12:
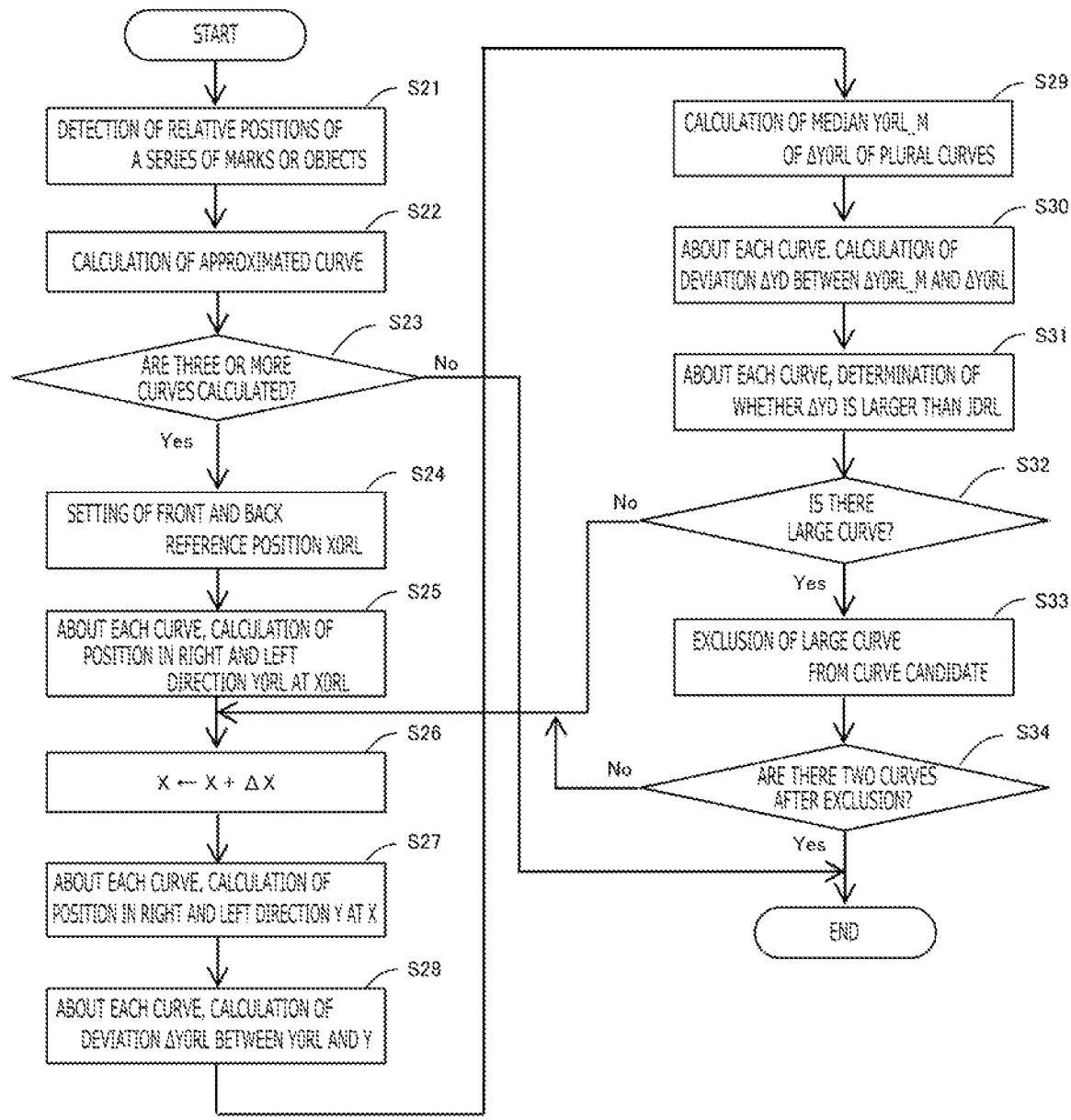
FIG. 12 is a flowchart for explaining the selection processing of two curves corresponding to the lane shape according to Embodiment 2.
Figure 13:
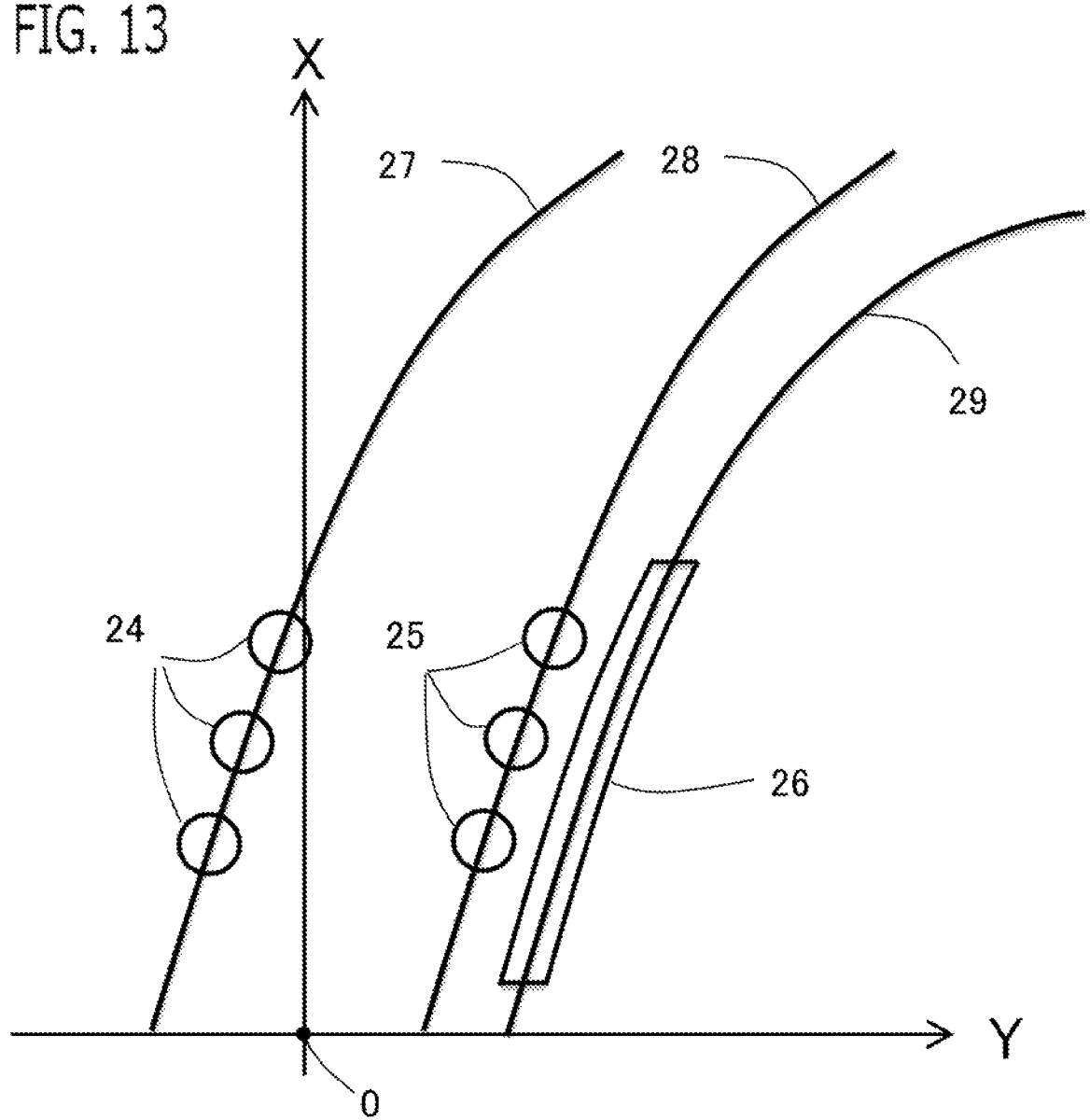
FIG. 13 is a figure for explaining the approximated curve calculation processing and the curve effective range determination processing according to Embodiment 2.
Figure 14:
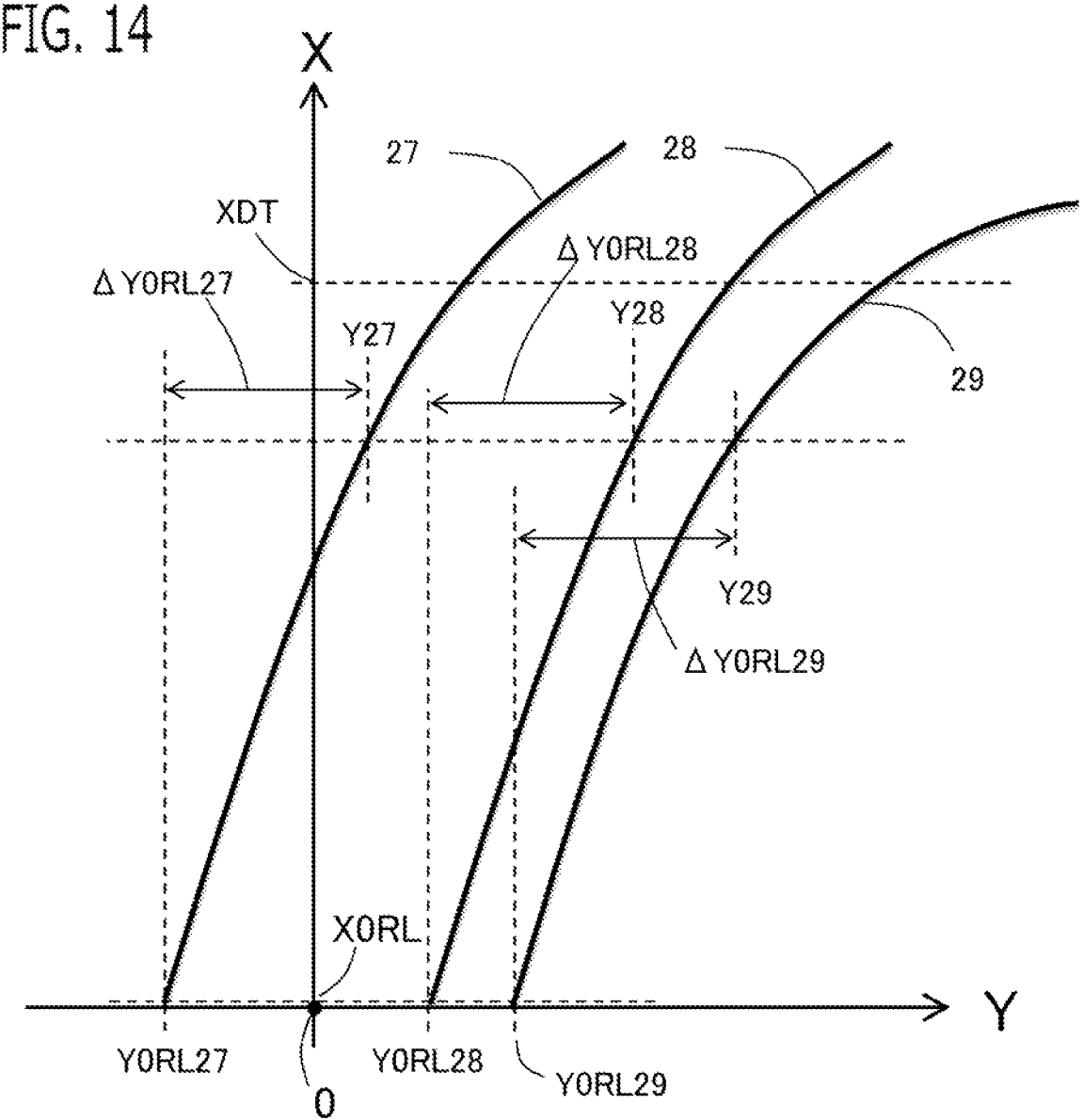
FIG. 14 is a figure for explaining the selection processing of two curves corresponding to the lane shape according to Embodiment 2.

Using the flowchart of FIG. 12 and the examples of FIG. 13 and FIG. 14, the selection process of the curve corresponding to the lane shape by the right and left deviation is explained. FIG. 13 and FIG. 14 are the examples in which the millimeter wave radar is used as the front monitoring apparatus 9.

In the step S21, as mentioned above, the mark object detection unit 1 detects relative positions of a series of marks or objects which are continuously arranged in front of the own vehicle, with respect to the own vehicle. In the step S22, as mentioned above, the approximated curve calculation unit 2 calculates a curve which approximates the relative positions of the series of marks or objects.

For example, in the example shown in FIG. 13, a plurality of guide poles 24 arranged in a line with a constant interval along with the left side roadside of the driving lane of the own vehicle are detected as a series of objects, a plurality of guide poles 25 arranged in a line with a constant interval along with the right side roadside of the driving lane are detected as a series of objects, and a wall 26 arranged along the lane on the right side of the plurality of guide poles 25 of the right side roadside is detected as a series of objects.

Then, the first curve 27 which approximated the relative positions of the plurality of guide poles 24 of left side is calculated, the second curve 28 which approximated the relative positions of the plurality of guide poles 25 of right side is calculated, and the third curve 29 which approximated the relative positions of the wall 26 of right side is calculated.

In the step S23, the curve effective range determination unit 3 determines whether three or more curves are calculated. When determining that three or more curves are calculated, the curve effective range determination unit 3 advances to the step S24 and sets the front and back reference position for right and left deviation X0RL in the front and back direction of the own vehicle. The front and back reference position for right and left deviation X0RL may be set to a preliminarily set position in the front and back direction, or may be set within an overlapping range in the front and back direction of the own vehicle where a range in the front and back direction where the series of marks or object used for each approximation of the plurality of curves are disposed overlaps between the plurality of curves (for example, the closest position closest to the own vehicle). In the example of FIG. 14, the front and back reference position for right and left deviation X0RL is set to 0 in the front and back direction.

Then, in the step S25, about each of the plurality of curves, the curve effective range determination unit 3 calculates a position Y in the right and left direction at the front and back reference position for right and left deviation X0RL, as the right and left reference position Y0RL. In the example of FIG. 14, about the first curve 27, the right and left reference position Y0RL27 of the first curve is calculated; about the second curve 28, the right and left reference position Y0RL28 of the second curve is calculated; and about the third curve 29, the right and left reference position Y0RL29 of the third curve is calculated.

In the step S26, the curve effective range determination unit 3 increases the position X in the front and back direction from the previous value by the step interval ΔX. The initial value of the position X in the front and back direction is set to the front and back reference position for right and left deviation X0RL.

Then, in the step S27, about each of the plurality of curves, the curve effective range determination unit 3 calculates the position Y in the right and left direction using the curve, at the position X in the front and back direction which was set in the step S26. In the example of FIG. 14, about the first curve 27, the position Y27 in the right and left direction of the first curve is calculated; about the second curve 28, the position Y28 in the right and left direction of the second curve is calculated; and about the third curve 29, the position Y29 in the right and left direction of the third curve is calculated.

In the step S28, about each of the plurality of curves, the curve effective range determination unit 3 calculates the right and left deviation ΔY0RL which is a deviation between the right and left reference position Y0RL and the position Y of the curve in the right and left direction, as shown in the next equation. In the example of FIG. 14, about the first curve 27, the right and left deviation ΔY0RL27 of the first curve is calculated; about the second curve 28, the right and left deviation ΔY0RL28 of the second curve is calculated; and about the third curve 29, the right and left deviation ΔY0RL29 of the third curve is calculated.

$$\Delta Y0RL = Y - Y0RL \tag{9}$$

In the step S29, the curve effective range determination unit 3 calculates the median ΔY0RL_M of the right and left deviations ΔY0RL of the plurality of curves. The median is a value located in the middle when data is arranged in ascending order. In the example of FIG. 14, the median ΔY0RL_M among the right and left deviation ΔY0RL27 of the first curve, the right and left deviation ΔY0RL28 of the second curve, and the right and left deviation ΔY0RL29 of the third curve is calculated.

Then, in the step S30, about each of the plurality of curves, the curve effective range determination unit 3 calculates the absolute value of deviation ΔYD between the median ΔY0RL_M and the right and left deviation ΔY0RL, as shown in the next equation. In the example of FIG. 14, the absolute value of deviation ΔYD of the first curve, the absolute value of deviation ΔYD of the second curve, and the absolute value of deviation ΔYD of the third curve are calculated.

$$\Delta YD = |\Delta Y0RL\_M - \Delta Y0RL| \qquad (10)$$

In the step S31, about each of the plurality of curves, the curve effective range determination unit 3 determines whether the absolute value of deviation ΔYD is larger than the right and left deviation threshold value JDRL. Then, in the step S32, when there is the curve whose absolute value of deviation ΔYD is larger than the right and left deviation threshold value JDRL, the curve effective range determination unit 3 advances to the step S33 and excludes the curve larger than the right and left deviation threshold value JDRL from the curve candidate. When there is no curve whose absolute value of deviation ΔYD is larger than the right and left deviation threshold value JDRL, it advances to the step S26. In the step S34, when the number of the curves after exclusion is two, the curve effective range determination unit 3 ends the series of processing. Or, when the number is three or more, it advances to the step S26.

In the example of FIG. 14, when the position X in the front and back direction becomes XDT, the absolute value of deviation ΔYD of the third curve becomes larger than the right and left deviation threshold value JDRL, the third curve 29 is excluded from the curve candidate, and the first curve 27 and the second curve 28 are determined as the two curves corresponding to the lane shape.

When the curve whose right and left deviation ΔY0RL deviates from the median ΔY0RL_M by the right and left deviation threshold value JDRL is the last curve on the left side or the right side of the own vehicle, the curve effective range determination unit 3 may not exclude this curve from the curve candidate. The determination whether it is the left side curve or the right side curve is determined by whether the position Y of the curve in the right and left direction when the position X in the front and back direction is 0 is located on the left side or the right side of the own vehicle. In this example, it is determined as the right side when Y>0, and it is determined as the left side when Y<0.

In the present embodiment, in the flowchart of FIG. 11 of Embodiment 1, the processing of the step S4 is changed, and the processing of other steps are the same. In the present embodiment, in the step S4, as mentioned above, the curve effective range determination unit 3 sets a front and back reference position for right and left deviation X0RL in the front and back direction of the own vehicle; and about each of the plurality of curves, calculates a position Y in the right and left direction of the own vehicle at the front and back reference position for right and left deviation X0RL, as a right and left reference position Y0RL. About each of the plurality of curves, the curve effective range determination unit 3 calculates a right and left deviation ΔY0RL which is a deviation between a position Y of the curve in the right and left direction, and the right and left reference position Y0RL at each position X in the front and back direction. Then, when changing a position X in the front and back direction from the front and back reference position for right and left deviation X0RL, the curve effective range determination unit 3 excludes the curve whose the right and left deviation ΔY0RL deviates from a median ΔY0RL_M of the right and left deviations ΔY0RL of the plurality of curves by a right and left deviation threshold value JDRL or more, from the plurality of curves, until becoming two curves; and determines that the remaining two curves correspond to the lane shape.

3. Embodiment 3

Next, the lane shape recognition system and the lane shape recognition method according to Embodiment 3 will be explained. The explanation for constituent parts the same as those in Embodiment 1 will be omitted. The basic configuration and processing of the lane shape recognition system according to the present embodiment are the same as those of Embodiment 1. In the present embodiment, processing of the approximated curve calculation unit 2 is different from Embodiment 1.

In the present embodiment, the approximated curve calculation unit 2 calculates a third-order curve (in this example, a third-order polynomial) within a specific range in a front and back direction of the own vehicle, and calculates a second-order curve (in this example, a second-order polynomial) within a range in the front and back direction other than the specific range.

For example, the next equation shows the case where the white line 20 of solid line on the left side of FIG. 4 of Embodiment 1 is approximated. In the present embodiment, the specific range is set to a range in the front and back direction X of the relative positions of the series of marks or objects (in this example, a range from the closest position XminL closest to the own vehicle to the farthest position XmaxL farthest from the own vehicle).

1) In the case of X<XminL $$Y = C0L + C3L \times X\min L^3 + (C1L - 3 \times C3L \times X\min L^2) \times X + (C2L + 3 \times C3L \times X\min L) \times X^2$$

2) In the case of XminL<=X<=XmaxL $$Y = C0L + C1L \times X + C2L \times X^2 + C3L \times X^3$$

3) In the case of XmaxL<X $$Y = C0L + C3L \times X\max L^3 + (C1L - 3 \times C3L \times X\max L^2) \times X + (C2L + 3 \times C3L \times X\max L) \times X^2 \qquad (11)$$

Instead the second-order curve, a lower-order curve than the third-order curve (for example, a clothoid curve, a circular arc, or the like) may be used.

OTHER EMBODIMENTS

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there was explained the case where the approximated curve calculation unit 2 calculates a polynomial as the curve. However, embodiments of the present disclosure are not limited to the foregoing case. That is to say, the approximated curve calculation unit may approximate using various kinds of curves, as long as the relative positions of the series of marks or objects can be approximated. For example, the approximated curve calculation unit 2 may approximate using a clothoid curve which uses a starting point, a starting point direction angle, a starting point curvature, and a change rate of curvature as parameters.

(2) In each of the above-mentioned Embodiments, there was explained the case where the curve effective range determination unit 3 increases or decreases the position X in the front and back direction by the step interval ΔX, and calculates each calculation value, such as the width W in the right and left direction, the absolute value of width deviation ΔW, the absolute value of curvature deviation Δρ, and the right and left deviation ΔY0RL, at each position X in the front and back direction. However, embodiments of the present disclosure are not limited to the foregoing case. That is to say, the curve effective range determination unit 3 may change the position X in the front and back direction with unequal intervals, and may calculate each calculation value at each position X in the front and back direction. For example, the curve effective range determination unit 3 may change the position X in the front and back direction to the closest position of the overlapping range RXO, the farthest position of the overlapping range RXO, and the extreme value of curve, and may calculate each calculation value.

(3) In the above Embodiment 1, there was explained the case where the curve effective range determination unit 3 determines whether two curves are the combination corresponding to the lane shape based on the width W in the right and left direction of two curves in the overlapping range RXO. In the above Embodiment 2, there was explained the case where about each of the plurality of curves, the curve effective range determination unit 3 calculates the right and left deviation ΔY0RL which is a deviation between the position Y of the curve in the right and left direction, and the right and left reference position Y0RL, and excludes the curve whose right and left deviation ΔY0RL deviates from the median ΔY0RL_M of the right and left deviations ΔY0RL of the plurality of curves by the right and left deviation threshold value JDRL or more, from the plurality of curves, until becoming two curves. However, the curve selecting method of Embodiment 1 and the curve selecting method of Embodiment 2 may be combined and performed. For example, when a plurality of combinations of two curves corresponding to the lane shape are selected by the curve selecting method of Embodiment 1, the curves may be excluded until becoming two curves, by the curve selecting method of Embodiment 2.

(4) In each of the above-mentioned Embodiments, there was explained the case where the curve effective range determination unit 3 performs both of the determination of the effective range by curve width, and the determination of the effective range by curvature difference, and sets an overlapping range between the effective range by width determination RXEW and the effective range by curvature determination RXEP, as the final effective range. The curve effective range determination unit 3 may perform only the determination of the effective range by curve width, and may set the effective range by width determination RXEW as the final effective range final as it is. Alternatively, the curve effective range determination unit 3 may perform only the determination of the effective range by curvature difference, and may set the effective range by curvature determination RXEP as the final effective range as it is.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: Mark object detection unit, 2: Approximated curve calculation unit, 3: Curve effective range determination unit, 4: Vehicle control unit, 9: Front monitoring apparatus, JDP: Curvature deviation threshold value, JDRL: Right and left deviation threshold value, JDW: Width deviation threshold value, RWP: Allowable width range, RXO: Overlapping range, W0: Reference width, X: Front and back direction, X0: Front and back reference position, X0RL: Front and back reference position for right and left deviation, Y: Right and left direction, Y0RL: Right and left reference position, ΔY0RL: Right and left deviation, ΔY0RL_M: Median of right and left deviation

What is claimed is:

1. A lane shape recognition system, comprising at least one processor configured to implement:
   a mark object detector that detects relative positions of a series of marks or objects which are continuously arranged in front of an own vehicle, with respect to the own vehicle;
   an approximated curve calculator that calculates a curve which approximates the relative positions of the series of marks or objects; and
   a curve effective range determiner that, when a plurality of the curves which are spaced from each other in a right and left direction of the own vehicle are calculated, mutually compares shapes of the plurality of curves, and determines the curves corresponding to lane shape and an effective range of the curves.

2. The lane shape recognition system according to claim 1,
   wherein the curve effective range determiner sets a combination of the two curves from the plurality of curves;
   in an overlapping range in a front and back direction of the own vehicle where a range in the front and back direction where the series of marks or object used for each approximation of the two curves are disposed overlaps between the two curves, calculates a width between the two curves in a right and left direction of the own vehicle; and
   when the width in the right and left direction deviates from a preliminarily set allowable width range corresponding to lane width, determines that the two curves are not a combination corresponding to lane shape, and when the width of the right and left direction falls within the allowable width range, determines that the two curves correspond to lane shape.

3. The lane shape recognition system according to claim 1,
   wherein the curve effective range determiner sets a front and back reference position for right and left deviation in a front and back direction of the own vehicle;
   about each of the plurality of curves, calculates a position of the curve in a right and left direction of the own vehicle at the front and back reference position for right and left deviation, as a right and left reference position;

about each of the plurality of curves, calculates a right and left deviation which is a deviation between the right and left reference position and a position of the curve in the right and left direction, at each position in the front and back direction;

when changing a position in the front and back direction from the front and back reference position for right and left deviation, excludes the curve whose right and left deviation deviates from a median of the right and left deviations of the plurality of curves by a right and left deviation threshold value or more, from the plurality of curves, until becoming the two curves; and determines that the remaining two curves correspond to lane shape.

4. The lane shape recognition system according to claim 1, wherein the curve effective range determiner sets a combination of the two curves from the plurality of curves;

sets a front and back reference position within an overlapping range in a front and back direction of the own vehicle where a range in the front and back direction where the series of marks or object used for each approximation of the two curves are disposed overlaps between the two curves;

calculates a width in the right and left direction of the own vehicle between the two curves at the front and back reference position, as a reference width; and determines a range in the front and back direction where an absolute value of deviation between a width in the right and left direction between the two curves at a position in the front and back direction and the reference width becomes smaller than a width deviation threshold value, as the effective range.

5. The lane shape recognition system according to claim 1, wherein the curve effective range determiner sets a combination of the two curves from the plurality of curves, wherein an area of a driving lane of the own vehicle is identified based on the combination of the two curves; and determines a range in a front and back direction of the own vehicle where an absolute value of deviation between curvatures of the two curves becomes smaller than a curvature deviation threshold value, as the effective range to be used with the area of the driving lane.

6. The lane shape recognition system according to claim 1, wherein the curve effective range determiner sets a combination of the two curves from the plurality of curves;

sets a front and back reference position within an overlapping range in a front and back direction of the own vehicle where a range in the front and back direction where the series of marks or object used for each approximation of the two curves are disposed overlaps between the two curves;

calculates a width in the right and left direction of the own vehicle between the two curves at the front and back reference position, as a reference width;

determines a range in the front and back direction where an absolute value of deviation between a width in the right and left direction between the two curves at a position in the front and back direction, and the reference width becomes smaller than a width deviation threshold value, as an effective range by width determination;

determines a range in a front and back direction of the own vehicle where an absolute value of deviation between curvatures of the two curves becomes smaller than a curvature deviation threshold value, as an effective range by curvature determination; and determines an overlapping range between the effective range by width determination and the effective range by curvature determination, as the final effective range.

7. The lane shape recognition system according to claim 1, wherein the mark object detector detects relative positions of a series of road surface lane markings which are continuously arranged in front of the own vehicle, based on an image data imaged by an optical camera; and wherein the approximated curve calculator calculates the curve for each the series of road surface lane markings.

8. The lane shape recognition system according to claim 1, wherein the mark object detector detects relative positions of a series of roadside objects which are continuously arranged in front of the own vehicle, based on a detection result of objects by a millimeter wave radar; and wherein the approximated curve calculator calculates the curve for each the series of roadside objects.

9. The lane shape recognition system according to claim 1, wherein the mark object detector detects relative positions of a series of roadside objects or a series of road surface lane markings which are continuously arranged in front of the own vehicle, based on a detection result of objects by a laser radar; and wherein the approximated curve calculator calculates the curve for each the series of roadside objects or the series of road surface lane markings.

10. The lane shape recognition system according to claim 1, further comprising a vehicle controller that performs one or both of a traveling control of vehicle and a guidance of traveling information of vehicle, based on information on the curve within the effective range.

11. A lane shape recognition method, comprising:

detecting relative positions of a series of marks or objects which are continuously arranged in front of an own vehicle, with respect to the own vehicle;

calculating a curve which approximates the relative positions of the series of marks or objects;

comparing, when a plurality of the curves which are spaced from each other in a right and left direction of the own vehicle are calculated, mutually compares shapes of the plurality of curves; and determining curves corresponding to a lane shape and an effective range of the curves corresponding to the lane shape.

12. The lane shape recognition system according to claim 1, wherein the approximated curve calculator calculates, as the curve, a polynomial in which a position in a front and back direction of the own vehicle is set as an independent variable, and a position in a right and left direction of the own vehicle is set as a dependent variable.

13. The lane shape recognition system according to claim 1, wherein the approximated curve calculator calculates a third-order curve within a specific range in a front and back direction of the own vehicle, and calculates a second-order curve within a range in the front and back direction other than the specific range.

* * * * *